R. LANCASTER.
VEHICLE SPRING.
APPLICATION FILED MAR. 14, 1908.
917,953.  Patented Apr. 13, 1909.
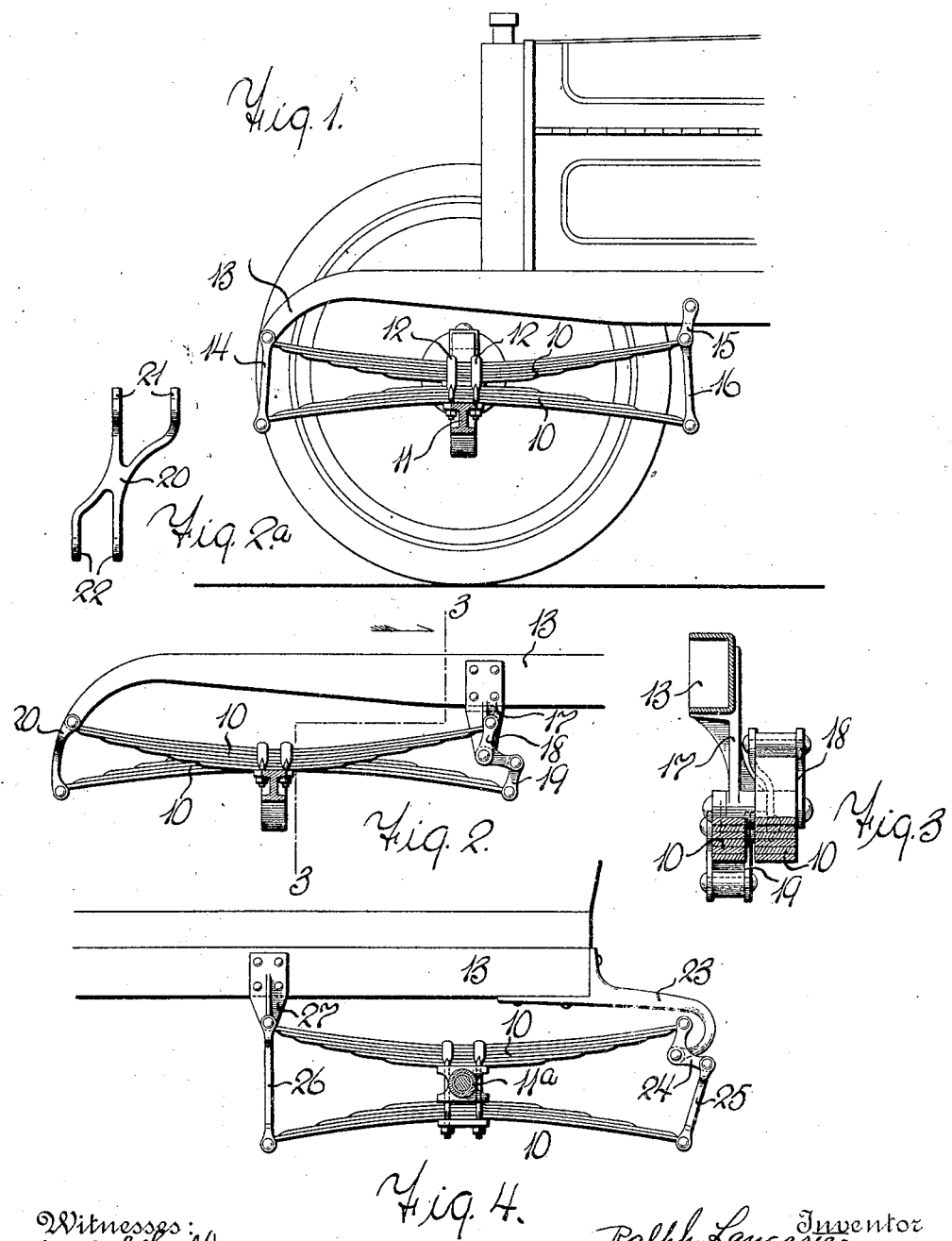

UNITED STATES PATENT OFFICE.

RALPH LANCASTER, OF NEWARK, NEW JERSEY.

VEHICLE-SPRING.

No. 917,953. Specification of Letters Patent. Patented April 13, 1909.

Application filed March 14, 1908. Serial No. 421,016.

*To all whom it may concern:*

Be it known that I, RALPH LANCASTER, of the city of Newark, county of Essex, and State of New Jersey, have invented a new and useful Improvement in Vehicle-Springs, of which the following is a full, clear, and exact description.

My invention relates to improvements in vehicle springs, and more especially to springs for automobiles. These machines are usually rather heavy and often run at high speed, and in practice it is found that ordinary springs which are sufficiently resilient to prevent too great shock when an obstruction or uneven place in the road is met, have so much up-throw on the reaction that it is disagreeable to the occupants of the vehicle, and in fact is sometimes dangerous as it is apt to throw the people from the seats.

The object of my invention is to produce a spring in which all the necessary resiliency is had, but in which the up-throw is guarded against, and I do this in such a way that there is no offensive shock in either direction up or down, for opposed springs are used which are tied together in such a way that the shock on the reaction of one is more or less absorbed by the other, and so through this opposed relation the car gradually assumes its normal level without being especially disturbed.

In carying out my invention, I use the ordinary laminated springs, but hang them in opposed relation and connect them together by links or levers at the end so that they act in opposition, and as stated the reaction of one will be partly taken up by the other.

My invention is also intended to apply the springs in this relation in a very simple and substantial manner, to the end that durable as well as easy springs may be provided for a vehicle.

Reference is to be had to the accompanying drawings forming a part of this specification, in which similar reference characters indicate corresponding parts in all the views.

Figure 1 is a side elevation of my improved spring as applied to an automobile, the latter being shown partly in section; Fig. 2 is a sectional side elevation of a slightly modified arrangement of the springs; Fig. 2ª is a detail elevation of a link used in Fig. 2, to connect the front ends of the opposed springs; Fig. 3 is a cross section on the line 3—3 of Fig. 2, and Fig. 4 illustrates another slightly modified arrangement in which the springs are shown on the rear axle of the vehicle.

The several modifications which I have shown are not modifications in principle, but show rather the adaptation of the opposed springs 10 to the vehicle, and it will be understood from the description which follows that other adaptations may be made without affecting the principle of the invention, which consists broadly in the opposite arrangement of opposed laminated springs and a suitable connection between the springs and the vehicle, and between the spring ends.

As shown in Figs. 1 and 2, laminated springs 10 are supported on the axle 11 of an automobile, and they are placed in opposition one above the other, being fastened by suitable clips 12, or equivalent devices. The front end of the upper spring 10 is pivoted to the bent end 13 of the vehicle frame, at which point, and by the same pivot, the spring also connects with a link 14, the lower end of which is attached to the front end of the lower spring 10. The rear ends of the springs connect together and connect to the frame 13 of the vehicle by the links 15 and 16, which are pivoted together as shown, and pivoted to the springs, so that these links act as toggle levers. Thus it will be seen that when the wheel and axle jump up toward the car, the ends of the spring 10 will be depressed, and on the reaction the toggles 15 and 16 will be drawn in and the tension on the lower spring 10 will be such as to absorb the shock and prevent too much up-throw. This action will be passed from one spring to the other until the springs resume their normal position, and the result is a very steady and easy movement of the vehicle body.

As shown in Figs. 2 and 3 I get at the same result, but here the springs are placed oppositely as in Fig. 1, except that they lie side by side, but their tension is in opposite directions. At their rear ends the springs instead of connecting by toggles, connect by the bell crank 18, which is pivoted on the bracket 17 on the frame 13, and the link 19 which is pivoted to one arm of the bell crank. The bell crank is pivoted at its elbow, and its upper arm is pivoted to one spring 10, while its lower arm connects by the link 19 with the second spring. At the forward ends the springs connect by the link 20 which is off-set as shown in Fig. 2, to provide for the off-set position of the springs, and is forked at its upper and lower ends as shown at 21 and 22 so as to receive the pivot bolts. The action in this case is the same as in the structure shown in Fig. 1, the shock of one spring being absorbed by the other, and it will be seen that the tilting of the bell crank and the action of the link 19 will be practically the same as that of the connected links 15 and 16.

In Fig. 4 I have shown a convenient way of applying the principle of the invention to the rear axle of a vehicle. In this case the springs are opposed, as before, but are fastened above and below the rear axle 11ª. The rear end of the upper spring is pivoted to a bell crank 24 which is in turn pivoted to the bracket 23 on the rear end of the frame 13, and the lower arm of the bell crank connects by a link 25 with the rear end of the lower springs 10. The springs at their front ends connect by the link 26, and the upper spring and link connect with the bracket 27 on the frame 13. The action here is as in the other cases, the up-throw of the upper spring being checked by the opposite tension of the lower spring 10 and no excessive movement being possible.

From the foregoing description it will be clear that the springs can be connected to the vehicle in a great many ways without affecting the principle of my invention, which lies in the opposed laminated springs connected together at the ends, and connected to the vehicle the connection being by levers which tend to draw the spring ends together thereby increasing their shock absorbing qualities. I also consider it advisable to have some kind of lever arrangement connecting the springs at one end at least, so that there will be a lever action between the springs t prevent the excessive up-throw. The springs which I have shown and described are the laminated springs generally referred to as leaf springs.

Having thus fully described my invention, I claim as new and desire to secure by Letters Patent:—

1. The combination with a vehicle, of opposed leaf springs supported on the vehicle axle, and pivotal connections between the spring ends and between the spring ends and the vehicle, at least one of said pivotal connections embodying a lever mechanism which tends to draw the spring ends toward each other.

2. The combination with a vehicle of opposed leaf springs supported on the vehicle axle with their middle portions next the axle and their end portions diverging, and a lever mechanism connecting the springs and vehicle frame, said lever mechanism tending to draw the spring ends toward each other.

3. The combination with a vehicle of opposed leaf springs supported on the vehicle axle, and a pivotal connection between the spring ends and between the spring ends and the adjacent part of the vehicle frame, at least one of said connections embodying a lever mechanism tending to draw the spring ends toward each other.

4. The combination with a vehicle, of opposed leaf springs supported on the vehicle axle, and link and lever mechanism connecting the spring ends together and with the vehicle, said mechanism embodying a bell crank connected to one member of the spring and to the vehicle, and a link connecting the bell crank with the end of the second spring.

RALPH LANCASTER.

Witnesses:
 EDWIN JAMES SELLEY,
 GEO. F. KRONER, Jr.